Aug. 28, 1951     F. BOTTOMLEY ET AL     2,565,675
ROTARY SEAL
Filed Dec. 8, 1945
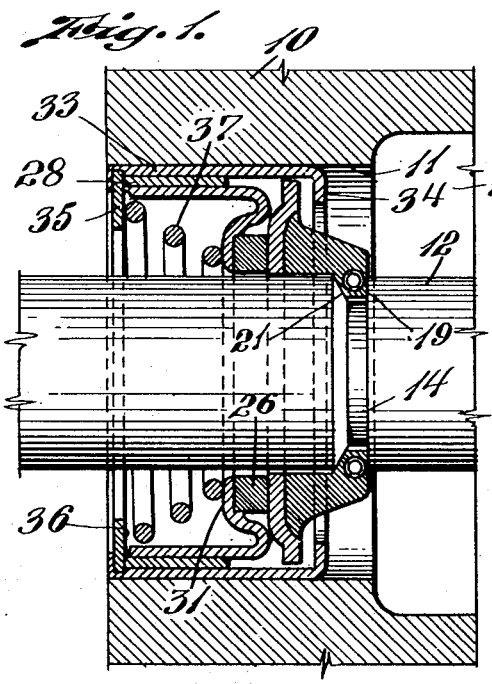
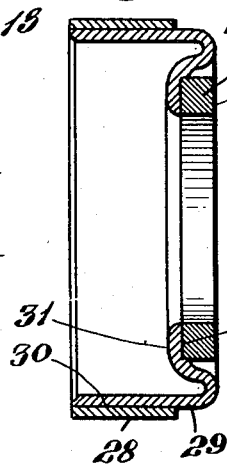
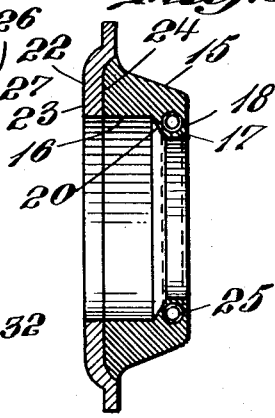
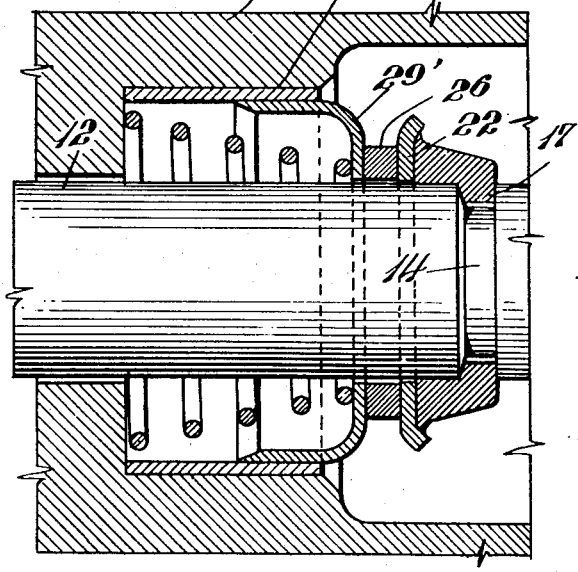
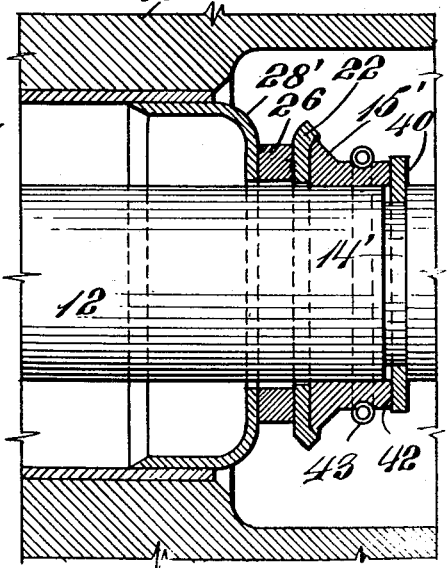
INVENTORS
Frank Bottomley
Justus B. Stevens
BY Barlow & Barlow
ATTORNEYS Patented Aug. 28, 1951

2,565,675

UNITED STATES PATENT OFFICE 2,565,675

ROTARY SEAL

Frank Bottomley, Barrington, and Justus B. Stevens, East Providence, R. I., assignors to Sealol Corporation, a corporation of Rhode Island Application December 8, 1945, Serial No. 633,798

11 Claims. (Cl. 286—11.15)

This invention relates to a seal for two relatively rotating parts, more particularly a seal about a shaft which extends from a casing. The seal is particularly adapted for a washing machine, or the like to provide a seal about the shaft which extends into the machine to prevent the escape of liquid around the shaft.

In the provision of a mechanical seal for liquid in a container, where shaft must extend into the container to perform some operation, it is quite usual that a spring is employed in some part of the seal. In the use of liquids, which provide a vehicle for a considerable amount of dirt, it has been found that some of this dirt will collect in the spring where the spring is enveloped in the liquid, and when this occurs, difficulty often develops in the proper functioning of a spring to cause a seal between the parts.

One of the objects of this invention is to provide an arrangement so that the spring is shielded from being contacted by the fluid which it is to seal, and thus is prevented from becoming clogged with any dirt which may be carried by the fluid.

Another object of this invention is to provide a seal which may be formed as a unit and positioned in place by a press fit or the like.

Another object of this invention is to provide a seal in which the rotary-driven part which attaches to the shaft is caused to have a driving grip on the shaft, by reason of its elasticity.

Another object of this invention is to provide a sealing and driving bond between the collar which encircles the shaft and the face plate which provides a sealing surface.

With these and other objects in view, the invention consists of certain novel features of construction, as will be more fully described and particularly pointed out in the appended claims.

In the accompanying drawings:

Fig. 1 is a sectional view showing the casing and shaft and the seal which is arranged therebetween;

Fig. 2 illustrates one member of the seal which provides a sealing surface;

Fig. 3 illustrates another member provided with a mating sealing surface;

Fig. 4 is a sectional view similar to Fig. 1 illustrating a modified form of seal; and Fig. 5 is a sectional view similar to Fig. 4 but illustrating a still different modified form.

In proceeding with this invention, we provide a groove in the shaft which is to be the rotating part of the combination, and then provide a sealing face which is bonded to an elastic collar which tightly encircles the shaft and grips the same by its inherent tendency to return from an expanded position thus providing a seal as well as a drive therefor. The fixed part of the seal consists of a collar or ring which has a flexible member bonded to it and also bonded to a part having a concave cylindrical surface, and which serves to house the spring and protect the spring from contact with the fluid which is to be sealed. The whole is inserted into an opening in the casing with a tight frictional grip between the part and casing.

With reference to the drawings, 10 designates a casing having a cylindrical opening 11 therethrough with a shaft 12 extending through this opening 11. Liquid located at 13 is desired to be prevented from escaping between the opening 11 and shaft 12.

The shaft 12 is provided with an annular groove 14 which is tapered and a collar 15 of rubber, or some imitation rubber such as "Neoprene" or the like is provided having a diameter 16 which is in normal position, equal to or greater than the diameter of the shaft 12. The collar 15 is provided with an inwardly extending projection 17, having a radial wall 18 to engage the wall 19 of the groove 14, and abut thereagainst, while the other side of this wall 17, designated 20, is tapered to fit the tapered surface 21 of the groove 14. The diameter of the projection 17 is such that it will be expanded when positioned over the shaft and will contract to cause this projection 17 to be wedged into the groove 14 with a tight fit. A metallic face plate 22 has a ground sealing face 23 and is bonded or otherwise attached as at 24 to the collar 15 so as to provide a driving engagement therewith and also to provide a sealing engagement therewith. In case it is desired to increase the contracting force of the collar 15, we may imbed a metallic spring 25 in this inward projection 17 so as to supplement the contracting force of this collar. This collar 15 and face plate 22 thus revolve with the shaft as the same is rotated to do work.

A mating sealing ring 26 is provided with a ground sealing surface 27, and may be of any suitable material such as carbon or a metal. This surface 27 engages the surface 23 so as to provide a rotary seal sufficiently tight to prevent the escape of liquid through the two. A sleeve 28 of some metallic substance and of a size to suitably fit into such opening or recess as is provided may be utilized, and a flexible member 29 of rubber or some imitation rubber of thin sheet form is bonded as at 30 to the sleeve 28 and also has an inwardly extending portion 31 which is bonded as at 32 to the sealing ring 26, thus providing fluid tight seals therewith.

This sleeve 28 may have a press fit with a casing 33 into which the collar 15 is also placed. This casing is flanged as at 34 to extend inwardly on the side of the plate 22 distant from the sleeve 28 so as to assemble the collar 15 with the mating sealing ring 26. A washer 35 extends radially inwardly from the casing 33 and provides an abutting wall 36 to be engaged by a spring 37 which presses against the portion 31 and through the portion 31 on the mating sealing ring 26 so as to force this sealing ring toward the right as shown in Fig. 1.

The casing 33 has a press fit with the main casing 10 by being forced into the cylindrical opening 11. This press fit is sufficiently tight to prevent the escape of fluid between the two contacting surfaces.

In assembly, the unit is positioned onto the shaft, usually from either end as shown in Fig. 1, the inwardly extending projection 17 being lodged in the annular groove 14. The casing 33 is positioned in the opening 11 so that the flange 34 will be clear of the plate 22 and place the spring under somewhat more compression. By this arrangement, the liquid is prevented from contacting spring 37 or depositing any dirt or foreign matter upon the spring by reason of its contact therewith.

In cases where it is not desired to have a complete single assembled unit in a casing 33, an arrangement such as shown in Fig. 4 may be provided. Here the flexible element or member 29' is bonded to a sleeve 28' which has a press fit directly with the opening in the casing 10. This member is also bonded to the sealing ring 26 and the other parts are as above described, except there is omitted the reinforcing spring 25 from the flange or projection 17.

A modification, however, may be provided in the collar 15, as shown at 15' in Fig. 5, where instead of a projection 17 extending inwardly we provide a washer abutment 40 extending into the recess 14' in the shaft 12. The collar 15' has its end 42 engaging the abutment 40, and a resilient spring-like member 43 encircling the collar 15' so as to supplement its inherent resiliency to contract and draw the same tightly about the shaft 12 so as to form a frictional driving engagement therewith. The other parts in this Fig. 5 are the same as shown in Fig. 4.

In some cases the spring 43 may be omitted and the collar 15' in such case will be bonded to the washer 40 at its end 42. The resiliency of the collar will hold the washer in the recess 14'.

We claim:

1. In combination, a casing having a cylindrical opening therein, a part presenting a concave cylindrical surface frictionally received in said opening, a shaft extending through and in spaced relation to said surface and provided with a radial annular abutment formed by the wall of an annular groove in said shaft, an elastic collar embracing said shaft and in tight friction driving contact therewith and having an end against said abutment, a face plate secured to said collar and preesnting a sealing surface, a mating sealing ring to engage said sealing surface and provide a rotary seal therewith, an abutment extending radially from said cylindrical surface, a spring acting between said abutment and rotary seal, and a flexible member secured to said sealing ring and to said cylindrical surface to exclude liquid to be sealed from said spring.

2. The combination set forth in claim 1 wherein said elastic collar when in contracted position has a portion of a diameter less than the diameter of said shaft which it encircles.

3. The combination set forth in claim 1 wherein said elastic collar is supplemented in its contraction by a metallic member.

4. The combination set forth in claim 1, wherein said elastic collar is supplemented in its contraction by a spring.

5. The combination set forth in claim 1 wherein said elastic collar is supplemented in its contraction by a spring imbedded in said collar.

6. The combination set forth in claim 1 wherein said collar is bonded to said face plate.

7. The combination set forth in claim 1 wherein said flexible member is bonded to said sealing ring.

8. The combination set forth in claim 1 wherein said flexible member is bonded to said sealing ring and to said cylindrical surface.

9. The combination set forth in claim 1 wherein said elastic collar when in contracted position is of a diameter less than the diameter of said shaft which it encircles and said flexbile member is bonded to said cylindrical surface.

10. The combination of a shaft provided with a groove therein having a wall at substantially right angles to the axis of said shaft to provide an abutment and the other wall tapered, an elastic collar embracing and closely fitting said shaft and having a radial flange to extend into said groove, one wall being at right angles to the axis of the shaft engaging said abutment and the other wall being tapered to substantially conform to the taper of the groove wall and resilient means to urge said flange into said groove in wedging relation therewith, a face plate secured to said collar and presenting a sealing surface to engage a sealing ring to provide a rotary seal therewith.

11. The combination of a shaft provided with a groove therein having a wall at substantially right angles to the axis of said shaft to provide an abutment, an elastic collar embracing and an abutment, an elastic collar embracing and closely fitting said shaft and having a radial flange to extend into said groove with a maximum axial dimension greater than the axial dimension of the groove, one wall of the flange being at right angles to the axis of the shaft engaging said abutment and the other wall being tapered, resilient means to urge said flange into said groove in wedging relation therewith, and a face plate secured to said collar and presenting a sealing surface to engage a sealing ring to provide a rotary seal therewith.

FRANK BOTTOMLEY.
JUSTUS B. STEVENS.

REFERENCES CITED

The following references are of record in the file of this patent:

UNITED STATES PATENTS

| Number | Name | Date |
|---|---|---|
| 1,204,063 | Pratt | Nov. 7, 1916 |
| 1,931,733 | Leibing | Oct. 24, 1933 |
| 2,167,699 | Molyneux | Aug. 1, 1939 |
| 2,167,986 | Lignian et al. | Aug. 1, 1939 |
| 2,249,141 | Johnson | July 15, 1941 |
| 2,353,988 | Batesole et al. | July 18, 1944 |
| 2,367,411 | Lillis | Jan. 16, 1945 |
| 2,377,452 | Reynolds | June 5, 1945 |
| 2,395,095 | Brady | Feb. 19, 1946 |
| 2,397,486 | Hoertz | Apr. 2, 1946 |
| 2,454,036 | Clayton-Wright | Nov. 16, 1948 |

FOREIGN PATENTS

| Number | Country | Date |
|---|---|---|
| 502,457 | Great Britain | of 1939 |
| 574,619 | Great Britain | Jan. 14, 1946 |